Jan. 30, 1951 W. A. GOOD ET AL 2,539,618
VIBRATION RESPONSIVE APPARATUS
Filed Jan. 15, 1946
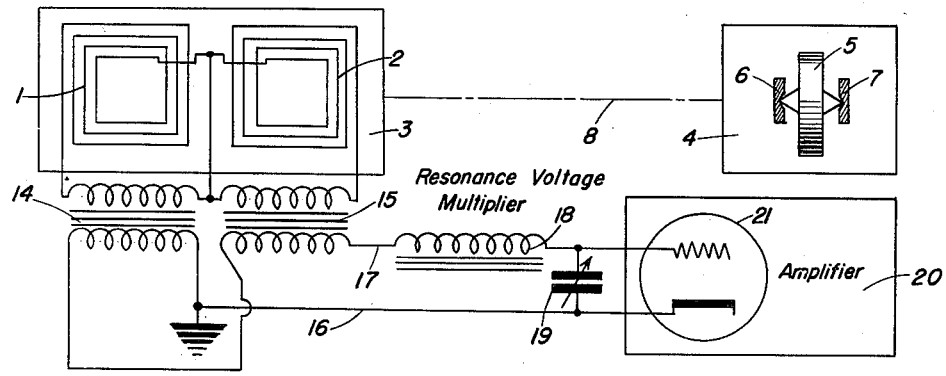
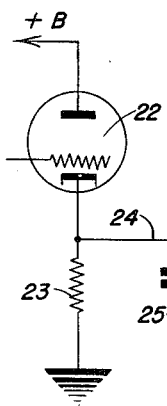
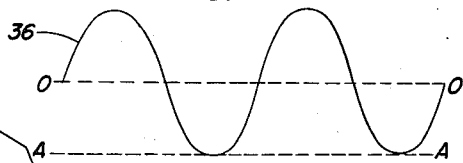
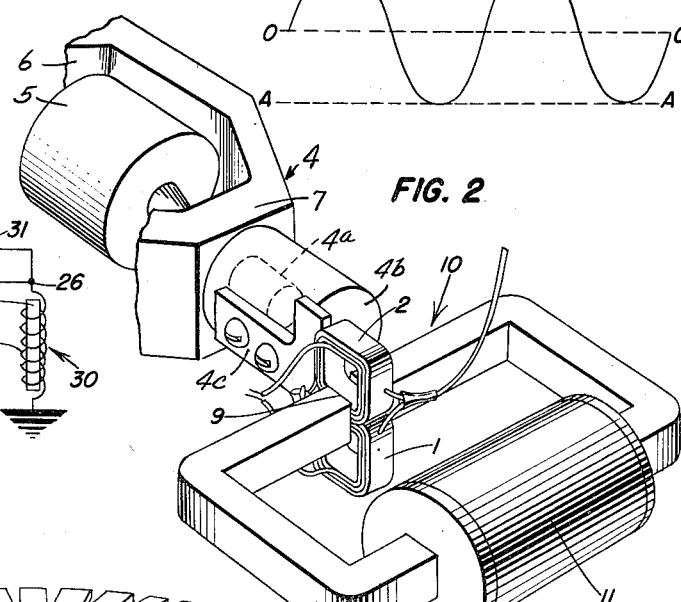
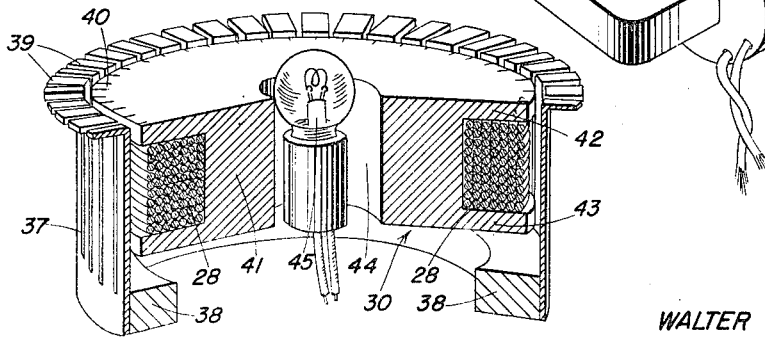
INVENTORS
WALTER A. GOOD
LORAN W. WENRICH
BY
ATTORNEY Patented Jan. 30, 1951

2,539,618

UNITED STATES PATENT OFFICE 2,539,618

VIBRATION RESPONSIVE APPARATUS

Walter A. Good, Washington, D. C., and Loran Wenrich, Silver Spring, Md., assignors to the United States of America as represented by the Secretary of the Navy Application January 15, 1946, Serial No. 641,341

2 Claims. (Cl. 73—70)

The present invention relates to vibration responsive apparatus and more particularly to tachometers of the vibrating-reed type, actuated by electromagnetic means, for measuring the speed of a gyroscope wheel, with the assistance of a vibration-pickup winding and a suitable amplifier.

Briefly the invention resides in the providing of means for producing a voltage of a frequency functionally related to the rotation frequency of a gyroscope rotor, by causing the natural vibration of the gyroscope, due to unavoidable minute dynamic unbalance, to produce relative motion between pickup coils secured to the gyroscope and a stationary magnetic field, means for amplifying such voltage and deriving a unidirectional voltage therefrom, electromagnetic means excited by the last-named voltage, and indicating means including a plurality of reeds, of which an appropriate one is caused to vibrate by the action of the electromagnetic means, thus indicating the rate of recurrence of the disturbance due to said dynamic unbalance, and thereby the corresponding speed of rotation.

A preferred embodiment of the invention is described herein and illustrated in the accompanying drawing, wherein:

Fig. 1 shows diagrammatically the voltage-producing and amplifying arrangements of the improved tachometer, comprising the pickup coils of a gyroscope and an amplifier, having an input circuit coupled to the coils.

Fig. 2 shows the relationship between the gyroscope with its pickup coils and the uniform magnetic field provided by a stationary air gap magnet.

Fig. 3 shows the circuit arrangement of the output tube of the amplifier;

Fig. 4 represents the wave-form of the amplifier output signal; and

Fig. 5 is a perspective view partly in section illustrating the mechanical structure of the improved electromagnetic vibrating-reed tachometer.

Referring first to Figs. 1 and 2, pickup coils I and 2 included in unit 3 are secured to a gyroscope gimbal 4. The gyroscope has a rotor 5, fitted to a spin axis journaled in bearings 6, 7. The pickup unit 3 is secured mechanically to the gyroscope by any appropriate expedient indicated by the dashed line 8, in such a manner that dynamic unbalance caused by rotation of rotor 5 displaces coils 1, 2 relative to the magnetic field in the air gap 9 of direct current electromagnet 10. One way of securing the coils 1 and 2 to the gyroscope gimbal 4 is shown in Fig. 2, wherein the bearings 6 and 7 are shown as the opposite ends of said gimbal 4 that pivotally supports the rotor 5. The gimbal 4 may, for example, have a lug 4a projecting from one end, on which is mounted a cylindrical support 4b carrying the T-shaped bracket 4c to which the pickup coils 1 and 2 are directly secured. Magnet 10 is excited by current flow in coil 11 and is secured to a stationary base (not shown). Displacement of coils 1—2 from a predetermined neutral position in the uniform magnetic field of gap 9 causes voltages to be induced in them. The coils and the stationary magnetic field function as a detector and generate an electrical signal indicative of a cyclical dynamic unbalance condition. Inasmuch as these pickup coils are connected in opposition, as far as the induced voltages are concerned, with a common lead connected to their junction, two transformers 14 and 15 are connected to the output of the pickup coils. The secondary windings of the transformers are connected in reversed relation to leads 16 and 17 so as to add the transformed voltages of the pickup coils cumulatively instead of in opposition. It has been found desirable to use opposed pickup coils to compensate for slight fluctuations in the magnetism produced by winding 11, such as occur when the magnetizing current is derived from an alternating current source by means of a rectifier and filter circuit. The voltages induced by such fluctuations of the magnetic field will then cancel, while the voltages due to vibratory shifting of the pick-off windings will not.

It will be understood that the voltages induced in the coils 1 and 2 are due only to relative motion of coils and magnetic field produced by vibration due to rotation of the gyroscope rotor. The amplitude of this vibration is necessarily very slight. Hence, very low voltages result, and it is necessary to amplify them to obtain useful signals. The first step in such amplification consists in making use of electrical resonance. To this end, a relatively high inductance 18 in series with a variable condenser 19 is connected to leads 16 and 17, in order to tune the output of transformers 14, 15. The wires 16 and 17 continue to the input terminals of an amplifier 20, and are connected to the cathode and grid, respectively, of the first tube 21 of the amplifier. As this connection is such as to amount practically to an open circuit, so far as condenser 19 is concerned, due to the high impedance of a cathode-grid input circuit, it does not disturb the resonant condition existing in the series-resonant circuit 18, 19 and thus does not substantially decrease the multiplication of voltage at the terminals of condenser 19, coupled to the amplifier input.

The internal circuits of the amplifier (shown in part only) may comprise any conventional arrangement of cascaded stages. They include a cathode-follower output stage including a vacuum tube 22. The anode current of tube 22 passes through a cathode-resistor 23, and produces a voltage drop therein. The anode of tube 22 is coupled to a suitable source of space current +B (not shown).

A conductor 24 connects the cathode of tube 22 to one side of a condenser 25. The other side of this condenser is connected to terminal 26 of exciting winding 28 of an electromagnet 30. Also connected to terminal 26 is a slider 31 of a resistor 32. This resistor is connected in series with a resistor 33 and a conductor 34. Conductors 24 and 34 and condenser 25 have a common junction. The terminals of coil 28 and resistor 23, remote from tube 22, are grounded.

Inasmuch as the current flowing through the cathode resistor 23 consists of an alternating current component superimposed on a direct current component, by proper selection of the magnitude of condenser 25, most of the alternating current may be made to travel through the condenser 25 branch, while the direct current passes through the conductor 34 branch.

By proper adjustment of resistor 32 the amount of unidirectional current flowing in wire 34 may be controlled, so that the total flow through winding 28 does not reverse its direction. This is illustrated in Fig. 4, where the voltage at the terminals of the condenser 25 is represented by the sine wave 36 having the time axis O—O. Wave 36, referred to axis O—O, represents the variation of potential at junction 26, referred to ground, that would occur if D. C. path 31—34 were not provided. In such case the level of axis O—O would be ground potential, point 26 being effectively grounded for direct currents. Obviously, wave 36 would then vary equally above and below this axis. Suppose now that the ground potential is lowered to the level A—A, by providing in coil 28 a constant unidirectional voltage represented by OA. This is accomplished by providing a D. C. path 31—34 and elevating the reference level of junction 26, now represented by O—O, above ground, represented by A—A. The effect of this is to raise the negative peaks of curve 36 to zero level or ground potential, thus shifting the entire curve to a new location wherein the voltage does not cross the new ground potential line, A—A.

Referring now to Fig. 5, the tachometer proper consists of a circularly arranged set of reeds 37, made of magnetic material, such as steel, and supported on a ring 38. These reeds are tuned to a selected series of frequencies of mechanical vibration, covering the range of rotational speeds of the gyroscope rotor desired to be measured. Each reed has a flag 39 at its free end, to indicate the state of rest or violent vibration of the reed in question, in cooperation with a scale 40 indicating the numerical value of rotation frequency corresponding thereto.

The coil of wire 28 is wound on a soft iron spool 41, having circular flanges 42 and 43 at its ends, and having a bore 44 to receive a lamp 45 to illuminate a scale 40.

It will be seen that each reed is closely adjacent the poles 42 and 43 of this iron core, and accordingly vibrates in unison with the pulsations of current in coil 28. Only those reeds having a natural frequency equal or close to the frequency of these current pulsations are set into violent resonant vibration.

The reason that the voltage wave 36 is employed as a pulsating unidirectional wave referred to level A—A as in Fig. 4, is to avoid a false indication of double the correct rotational speed. The alternating curve referred to level O—O has twice as many maxima as the mechanical frequency producing it, since each rotation of the gyroscope rotor provides a complete cycle of alternating voltage. If the amplifier output signal were not altered, as in Fig. 4, the readings would not be correct.

While there has been described what is at present considered the preferred embodiment of the present invention, it will be obvious to those skilled in the art that various changes and modifications may be made therein without departing from the true spirit of the invention and it is, accordingly intended in the appended claims to cover all such changes and modifications as fall within the true scope of the invention and without the prior art.

What is claimed is:

1. An apparatus for producing and amplifying potential variations, responsive to vibrations due to lack of dynamic balance of a rotating element, said apparatus comprising a coil and means mechanically connecting said coil to the rotating element so as to partake of the vibrations thereof, means for producing a steady unidirectional magnetic field interlinked with the coil, whereby voltages are induced in said coil due to said vibrations, a transformer having a low-voltage primary winding connected to the terminals of said coil and a high-voltage secondary winding, a circuit containing an inductance unit and a capacitance unit connected in series with one another and with said secondary winding, one of said units being adjustable to vary the resonant frequency of said circuit, and an amplifier having its input terminals connected to the terminals of one of said units.

2. An apparatus for producing and amplifying potential variations, responsive to vibrations due to lack of dynamic balance of a rotating element, which comprises a pair of pickup windings and means mechanically connecting said windings to the rotating element, so as to partake of the vibrations thereof, means for producing an unvarying stationary magnetic field passing through both said pickup windings whereby voltages are induced in said windings due to said vibrations, two transformers, each having its primary winding connected to a corresponding one of said pickup windings, the secondary windings of said transformers being connected in additive series relationship, to add the output voltages thereof in phase with one another, a circuit including an inductance unit and a capacitance unit in series, also connected in series with said secondary windings, one of said units being variable for adjusting the resonant frequency of said circuit, and an amplifier having its input terminals connected to the terminals of said capacitance.

WALTER A. GOOD.
LORAN WENRICH.

REFERENCES CITED

The following references are of record in the file of this patent:

UNITED STATES PATENTS

| Number | Name | Date |
|---|---|---|
| 1,030,050 | Bogen | June 18, 1912 |
| 1,165,082 | Finnigan | Dec. 21, 1915 |
| 1,951,226 | Wold | Mar. 13, 1934 |
| 2,008,699 | Hammond, Jr. | July 23, 1935 |
| 2,050,073 | Thearle | Aug. 4, 1936 |
| 2,361,396 | Gross | Oct. 31, 1944 |
| 2,381,645 | Carlstein | Aug. 7, 1945 |
| 2,399,297 | Rudolph | Apr. 30, 1946 |
| 2,403,809 | Lingel | July 9, 1946 |
| 2,422,134 | Sanders | June 10, 1947 |

OTHER REFERENCES

Radio News, December 1944, article by Turner at pages 42–44, 90, 93.